B. KOSUBOSKI.
DIFFERENTIAL GEARING.
APPLICATION FILED JAN. 26, 1920.
1,409,347.
Patented Mar. 14, 1922.
2 SHEETS—SHEET 1.
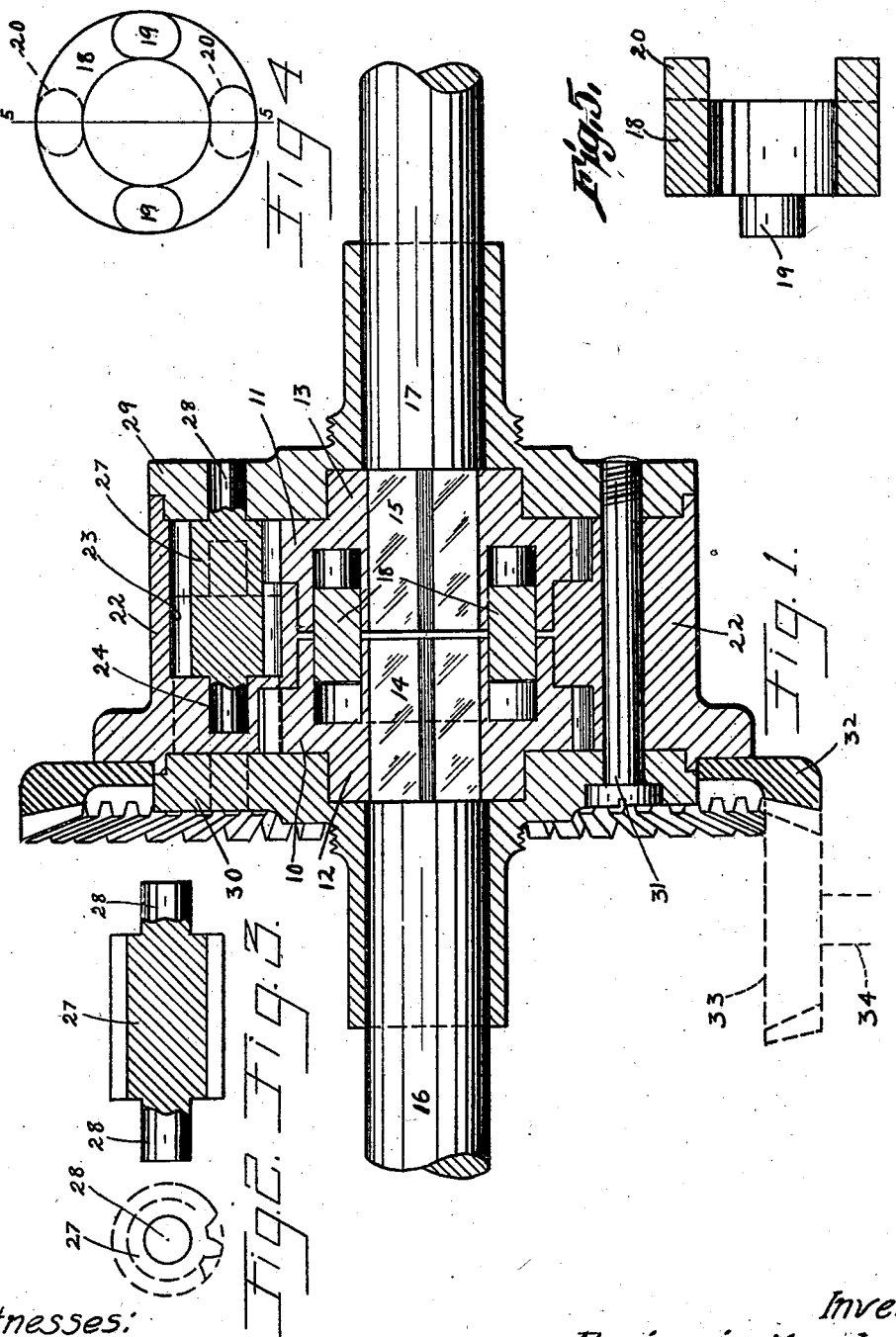
Witnesses:
Benj. Schechter
B. G. Richards
Inventor:
Benjamin Kosuboski
By Joshua R. H. Potts
Attorney.

B. KOSUBOSKI.
DIFFERENTIAL GEARING.
APPLICATION FILED JAN. 26, 1920.
1,409,347.
Patented Mar. 14, 1922.
2 SHEETS—SHEET 2.
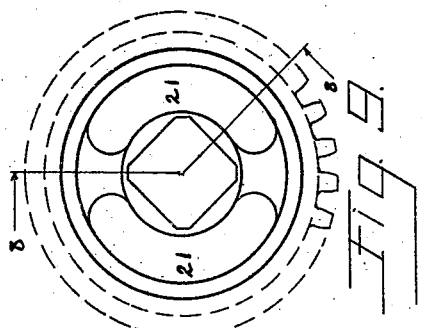
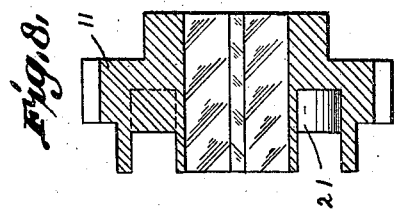
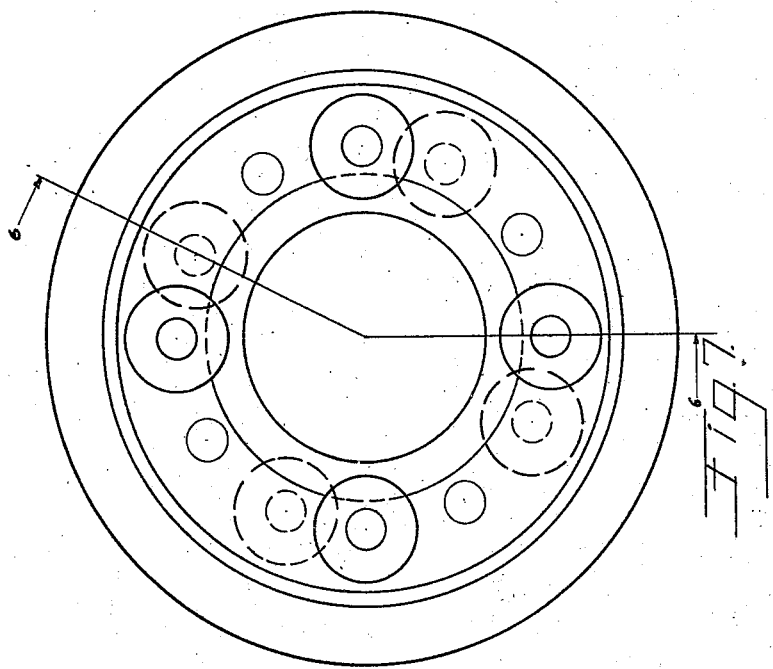
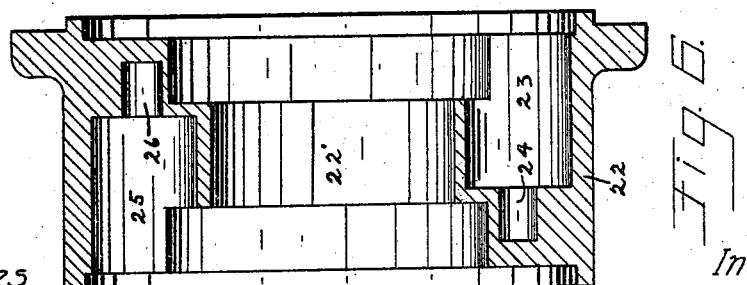
Witnesses
Benj. Schechter.
B. Y. Richards
Inventor:
Benjamin Kosuboski
By Joshua R. H. Potts
Attorney.

UNITED STATES PATENT OFFICE.

BENJAMIN KOSUBOSKI, OF CLINTONVILLE, WISCONSIN, ASSIGNOR OF ONE-HALF TO MAURICE KILEY, OF CLINTONVILLE, WISCONSIN.

DIFFERENTIAL GEARING.

1,409,347.     Specification of Letters Patent.     Patented Mar. 14, 1922.

Application filed January 26, 1920. Serial No. 353,942.

*To all whom it may concern:*

Be it known that I, BENJAMIN KOSUBOSKI, a citizen of the United States, and a resident of the city of Clintonville, county of Waupaca, and State of Wisconsin, have invented certain new and useful Improvements in Differential Gearing, of which the following is a specification.

My invention relates to improvements in differential gearing, and has for its object the provision of a simple and efficient construction of this character, which is capable of economical manufacture.

Other objects will appear hereinafter.

The invention consists in the combinations and arrangements of parts hereinafter described and claimed.

The invention will be best understood by reference to the accompanying drawings forming a part of this specification, and in which, Fig. 1, is a transverse section of a differential gearing embodying the invention, Fig. 2, is an end view of one of eight pinions employed in the construction, Fig. 3, is a transverse section of one of said pinions, Fig. 4, is an end view of a locking member employed in the construction, Fig. 5, is a section taken on line 5—5 of Fig. 4, Fig. 6, is a transverse section of a bearing block employed in the construction, said section being taken on substantially line 6—6 of Fig. 7, Fig. 7, is an end view corresponding with Fig. 6, Fig. 8, is a transverse section of one of two axle gears employed in the construction, said section being taken on substantially line 8—8 of Fig. 9, Fig. 9, is an end view corresponding with Fig. 8.

The preferred form of construction, as illustrated in the drawings, comprises two axle gears 10 and 11 formed with squared openings through their hubs, adapted to fit the squared ends 14 and 15 respectively of the axle section 16 and 17. A locking member 18 in the form of a ring is fitted loosely within annular recesses formed in the adjacent sides of the hubs of gears 10 and 11, said locking rings being provided on opposite sides with lugs 19 and 20 adapted to fit loosely within segmental recesses or grooves 21 formed in the hubs of gears 10 and 11, said arrangement permitting of limited rotation of said axle gears and their corresponding axle sections relatively to said locking member and to each other.

A bearing block 22 in the form of an annular ring having a bore 22' adapted and arranged to fit loosely over the adjacent hub portions of the gears 10—11 is fitted over said gears and provided with pinion pockets, as indicated. Two sets of pinion pockets are provided in the bearing block 22, there being four of said pinion pockets in each set, and said sets of pinion pockets being transversely displaced with reference to each other. One set of pinion pockets consists of the four pockets 23, each having a trunnion bearing 24 formed at its bottom and being equally spaced circumferentially and opening at one side of the bearing block 22. The other set of pinion pockets consists of four pockets 25, each having a trunnion bearing 26 at its bottom and equally spaced circumferentially and opening toward the opposite side of the bearing block 22, as best shown in Figs. 6 and 7. A pinion 27 is fitted within each of the pockets 23—25, each of said pinions being provided with integral trunnions 28 at its ends and one of said trunnions on each pinion fitting within the corresponding trunnion bearing in the bottom of the corresponding pocket. The pockets are so positioned radially that when the pinions 27 are thus positioned in the respective pockets one set of pinions meshes with the gear 11 and the other set meshes with the gear 10, as indicated in Fig. 1. End plates 29 and 30 are arranged on opposite sides of the bearing block 22 and are secured in place by screw bolts 31, as indicated in Fig 1, each of said end plates being provided with trunnion bearings to receive the trunnions on the corresponding set of pinions. The usual face or crown gear 32 is secured to the bearing block 22 to mesh with the usual bevel gear 33 on the usual driving shaft 34, as indicated in dotted lines in Fig. 1.

By this arrangement, a simple and effective differential gearing is provided for operating automobiles or the like in the usual manner. It will be observed that the gearing may be readily taken apart or re-assembled and is composed largely of duplicate or similar parts, and thus capable of economical manufacture.

While I have illustrated and described the preferred form of construction for carrying my invention into effect, this is capable of variation and modification without departing from the spirit of the invention. I therefore, do not wish to be limited to the precise details of the construction set forth, but desire to avail myself of such variations and modifications as come within the scope of the appended claims.

Having described my invention, what I claim as new and desire to secure by Letters Patent is:—

1. A differential gearing comprising a casing provided with aligned trunnion bearings arranged in pairs transversely displaced with reference to each other; pinions having trunnions at their ends mounted in said bearings and transversely displaced with reference to each other; axle gears having segmental recesses within said casing meshing with said pinions; and locking means between said gears and engaging said recesses permitting of limited rotation thereof relatively to each other, substantially as described.

2. A differential gearing comprising a casing provided with aligned trunnion bearings arranged in pairs alternately and transversely displaced with reference to each other; pinions having trunnions on their ends mounted in said bearings and transversely displaced with reference to each other; axle gears within said casing meshing with said pinions; and locking means positioned between said gears permitting of limited rotation thereof relatively to each other, substantially as described.

3. A differential gearing comprising a casing provided with aligning trunnion bearings; pinions having trunnions at their ends mounted in said bearings; axle gears within said casing meshing with said pinions; and a lock between said gears permitting of limited rotation thereof relatively to each other, substantially as described.

4. A differential gearing comprising a casing provided with aligning trunnion bearings arranged in pairs transversely displaced with reference to each other; pinions having trunnions at their ends mounted in said bearings; axle gears within said casing meshing with said pinions; and a lock between said gears permitting of limited rotation thereof relatively to each other, substantially as described.

5. A differential gearing comprising a casing provided with aligning trunnion bearings arranged in pairs alternately transversely displaced with reference to each other; pinions having trunnions at their ends mounted in said bearings; axle gears within said casing meshing with said pinions; and a lock between said gears permitting of limited rotation thereof relatively to each other, substantially as described.

6. A differential gearing comprising a casing made up of three separable parts consisting of a central annular bearing block and end members secured to the opposite sides thereof, said bearing block having pinion pockets therein transversely displaced with reference to each other and opening toward opposite sides thereof, there being trunnion bearings at the bottoms of said pockets and aligning trunnion bearings in said end members; pinions mounted in said pockets and having trunnions at their ends mounted in said trunnion bearings; and axle gears within said casing meshing with said pinions, substantially as described.

7. A differential gearing comprising a casing made up of three separable parts consisting of a central annular bearing block and end members secured to the opposite sides thereof, said bearing block having pinion pockets therein transversely displaced with reference to each other and opening toward opposite sides thereof, there being trunnion bearings at the bottoms of said pockets and aligning trunnion bearings in said end members; pinions mounted in said pockets and having trunnions at their ends mounted in said trunnion bearings; axle gears within said casing meshing with said pinions; and a lock between said gears permitting of limited rotation relatively to each other, substantially as described.

8. In a differential gearing, the combination with two axle gears, of a locking member positioned between said gears and permanently connected thereto to permit of but limited rotation of said gears relatively to each other, substantially as described.

9. In a differential gearing, the combination of two axle gears having segmental recesses therein; and a locking member positioned between said gears and having lugs engaging said recesses to permit of but limited rotation of said gears relatively to said lock member and to each other, substantially as described.

In testimony whereof I have signed my name to this specification in the presence of two subscribing witnesses.

BENJAMIN KOSUBOSKI.

Witnesses:
ARTHUR V. CLUMPNER,
JOHN H. ENGELS.